(12) United States Patent
Beuneken et al.

(10) Patent No.: US 11,384,903 B2
(45) Date of Patent: Jul. 12, 2022

(54) CRYOGENIC FLUID STORAGE TANK

(71) Applicant: L'Air Liquide, Societe Anonyme pour l'Etude et l'Exploitation des Procedes Georges Claude, Paris (FR)

(72) Inventors: Olivier Beuneken, Le Blanc Mesnil (FR); Didier Geneste, Paris (FR); Regis Pointeau, Paris (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 17/311,125

(22) PCT Filed: Nov. 25, 2019

(86) PCT No.: PCT/FR2019/052792
§ 371 (c)(1),
(2) Date: Jun. 4, 2021

(87) PCT Pub. No.: WO2020/115394
PCT Pub. Date: Jun. 11, 2020

(65) Prior Publication Data
US 2022/0026028 A1    Jan. 27, 2022

(30) Foreign Application Priority Data
Dec. 6, 2018 (FR) ...................................... 1872428

(51) Int. Cl.
*F17C 5/02* (2006.01)
*F17C 7/04* (2006.01)
(Continued)

(52) U.S. Cl.
CPC ............... *F17C 7/04* (2013.01); *F17C 5/02* (2013.01); *F17C 13/025* (2013.01); *F17C 13/04* (2013.01);
(Continued)

(58) Field of Classification Search
CPC ...... F17C 7/04; F17C 5/02; F17C 5/06; F17C 13/04; F17C 2205/0326; F17C 2205/0332;
(Continued)

(56) References Cited

U.S. PATENT DOCUMENTS

| 5,121,609 A | * | 6/1992 | Cieslukowski | ........... F17C 7/02 123/527 |
| 5,228,295 A | * | 7/1993 | Gustafson | ................. F17C 9/00 62/7 |

(Continued)

FOREIGN PATENT DOCUMENTS

| FR | 2 238 893 | 2/1975 |
| FR | 2 841 963 | 1/2004 |

(Continued)

OTHER PUBLICATIONS

International Search Report and Written Report for PCT/FR2019/052792, dated May 11, 2020.
(Continued)

*Primary Examiner* — Nicolas A Arnett
(74) *Attorney, Agent, or Firm* — Christopher J. Cronin

(57) ABSTRACT

The invention relates to a tank for storing a two-phase cryogenic mixture of liquid and gas, comprising a first casing, at least one drawing pipe, a tank filling circuit, the tank comprising a sensor assembly measuring the pressure in the first casing, the tank comprising a pipe for pressurizing the internal casing, comprising an upstream end connected to the lower end of the first casing and a downstream end connected to the upper part of the first casing, the pressurization line comprising at least one regulating valve and a heater, in particular a vaporization heat exchanger. The invention is characterized in that the regulating valve is configured to automatically maintain the pressure in the first casing at a minimum value by ensuring, when the pressure (Continued)

in the first casing is lower than said first value, a circulation of liquid taken from the first casing in the heater and a re-injection of said heated fluid into the first casing.

17 Claims, 5 Drawing Sheets

(51) Int. Cl.
*F17C 13/02* (2006.01)
*F17C 13/04* (2006.01)

(52) U.S. Cl.
CPC ............ *F17C 2205/0326* (2013.01); *F17C 2205/0332* (2013.01); *F17C 2205/0338* (2013.01); *F17C 2223/0161* (2013.01); *F17C 2227/0393* (2013.01); *F17C 2250/043* (2013.01); *F17C 2250/0434* (2013.01); *F17C 2250/0626* (2013.01); *F17C 2260/021* (2013.01); *F17C 2265/063* (2013.01); *F17C 2270/0171* (2013.01)

(58) Field of Classification Search
CPC ...... F17C 2205/0338; F17C 2205/0314; F17C 2205/0364; F17C 2223/0161; F17C 2227/0393; F17C 2227/0107; F17C 2250/043; F17C 2250/0434; F17C 2250/0626; F17C 2250/0636; F17C 2250/075; F17C 2260/021; F17C 2260/036; F17C 2260/044; F17C 2265/063; F17C 2270/0171; F17C 2201/0109; F17C 2201/032; F17C 2201/035; F17C 2201/054; F17C 2203/0391; F17C 2221/014; F17C 2225/0115; F17C 2225/0161; F17C 2225/033; F17C 2225/035
See application file for complete search history.

(56) References Cited

U.S. PATENT DOCUMENTS

| | | | | |
|---|---|---|---|---|
| 5,325,894 A * | 7/1994 | Kooy | ............ | F17C 5/007 141/2 |
| 5,353,849 A * | 10/1994 | Sutton | ............ | F17C 13/023 141/46 |
| 5,644,921 A * | 7/1997 | Chowdhury | ............ | F17C 9/02 62/48.1 |
| 5,771,946 A | 6/1998 | Kooy et al. | | |
| 6,505,469 B1 * | 1/2003 | Drube | ............ | F17C 7/04 62/48.1 |
| 6,799,429 B2 * | 10/2004 | Drube | ............ | F17C 9/02 62/50.2 |
| 7,637,280 B2 | 12/2009 | Gaget et al. | | |
| 8,104,296 B2 * | 1/2012 | Harper | ............ | F17C 3/00 62/45.1 |
| 8,353,314 B2 * | 1/2013 | Radford | ............ | F17C 13/04 251/149.6 |
| 8,671,997 B2 * | 3/2014 | Allidieres | ............ | F17C 13/026 141/82 |
| 9,546,645 B2 * | 1/2017 | Allidieres | ............ | F04B 23/02 |
| 9,752,727 B2 * | 9/2017 | Drube | ............ | F17C 7/02 |
| 9,752,728 B2 * | 9/2017 | Tang | ............ | F17C 7/04 |
| 9,869,428 B2 * | 1/2018 | Drube | ............ | F04B 15/08 |
| 10,125,751 B2 * | 11/2018 | Johnson | ............ | F17C 7/04 |
| 10,400,712 B2 * | 9/2019 | Garner | ............ | F02M 21/0212 |
| 10,767,573 B2 * | 9/2020 | Högnabba et al. | ............ | F02M 21/0221 |
| 11,079,071 B2 * | 8/2021 | Nagura | ............ | B67D 7/0492 |
| 11,248,747 B2 * | 2/2022 | Gustafson | ............ | F17C 3/00 |
| 2004/0221918 A1 * | 11/2004 | Viegas | ............ | F17C 9/00 141/82 |
| 2008/0307798 A1 * | 12/2008 | Luo | ............ | F17C 13/02 220/560.12 |
| 2015/0330572 A1 * | 11/2015 | Jansson | ............ | F17C 5/04 141/4 |
| 2016/0003524 A1 * | 1/2016 | Blalock | ............ | F25J 1/0012 62/48.2 |
| 2017/0108170 A1 | 4/2017 | Gustafson | | |
| 2021/0372565 A1 * | 12/2021 | Beuneken | ............ | F17C 5/02 |
| 2022/0026024 A1 * | 1/2022 | Beuneken | ............ | F17C 13/025 |
| 2022/0026028 A1 * | 1/2022 | Beuneken | ............ | F17C 5/06 |

FOREIGN PATENT DOCUMENTS

| | | |
|---|---|---|
| FR | 2 845 451 | 4/2004 |
| FR | 2 941 767 | 8/2010 |
| WO | WO 2014/091060 | 6/2014 |

OTHER PUBLICATIONS

French Search Report and Written Opinion for FR 1 872 428, dated Jul. 26, 2019.

* cited by examiner

CRYOGENIC FLUID STORAGE TANK

CROSS-REFERENCE TO RELATED APPLICATIONS

This application is a § 371 of International PCT Application PCT/FR2019/052792, filed Nov. 25, 2019, which claims § 119(a) foreign priority to French patent application FR 1872428, filed Dec. 6, 2018.

BACKGROUND

Field of the Invention

The invention relates to a cryogenic fluid storage tank.

More specifically, the invention relates to a tank for storing cryogenic fluid, and in particular a two-phase mixture of liquid and of gas, comprising a first casing intended to contain the cryogenic fluid, at least one drawing-off pipe having an upstream end connected to the first casing and being configured to allow fluid contained in the first casing to be drawn-off toward the outside of the tank, a circuit for filling the tank, the tank comprising a set of one or more sensor(s) measuring the pressure in the first casing, the tank comprising a pipe for pressurizing the first casing comprising a first end connected to the lower end of the first casing and a second end connected to the upper part of the first casing, the pressurization pipe comprising at least one regulating valve and a heater, in particular a vaporization heat exchanger.

Related Art

Maintaining a constant pressure inside such tanks is difficult or unsatisfactory. The air venting equipment (back pressure regulator) in the event of excess pressure in the tank is separate from the regulating device/economizer that maintains the pressure in the tank above a minimum value.

The known systems require complex adjustments. Furthermore, the adjustments of these two devices can prove to be inconsistent/conflicting.

Moreover, a complex system is often required for implementing pressure regulation in the lower part of the tank (in the liquid part).

SUMMARY OF THE INVENTION

An aim of the present invention is to overcome all or some of the aforementioned disadvantages of the prior art.

To this end, the tank according to the invention, and also in accordance with the generic definition provided in the above preamble, is basically characterized in that the regulating valve of the pressurization pipe is configured to automatically maintain the pressure in the first casing at a minimum determined pressure value by ensuring, when the pressure in the first casing is lower than said minimum value, that liquid taken from the first casing is circulated in the heater and that this heated fluid is re-introduced into the first casing.

Furthermore, embodiments of the invention can comprise one or more of the following features:
- the regulating valve of the pressurization pipe is sensitive to the pressure measured by the set of one or more sensor(s) measuring the pressure in the first casing, i.e. said regulating valve comprises at least one movable element closing or opening a passage for the fluid in the pressurization pipe, said movable element being opened or closed according to the pressure difference between, on the one hand, a setting force corresponding to a minimum pressure value and, on the other hand, the pressure measured by the set of one or more sensor(s);
- the regulating valve of the pressurization pipe comprises at least one electrically controlled valve and an electronic device for controlling the controlled valve configured to control the opening and the closing of the valve as a function of, on the one hand, the minimum pressure value and, on the other hand, the pressure measured by the set of one or more sensor(s);
- the tank comprises a vaporized gas drawing-off pipe comprising a first upstream end connected to the upper part of the first casing for drawing-off fluid in the gaseous state, said vaporized gas drawing-off pipe comprising a vaporizer and at least one regulating valve toward a downstream distribution end;
- the vaporized gas drawing-off pipe comprises a second upstream end connected to the lower part of the first casing, said second upstream end being connected to the vaporizer, to allow fluid to be drawn-off in the liquid state and to be vaporized in the vaporizer with a view to supplying vaporized gas at the downstream distribution end;
- the regulating valve of the vaporized gas drawing-off pipe is configured to automatically reduce, during drawing-off via said drawing-off pipe, the pressure in the first casing below a first maximum value by ensuring, when the pressure in the first casing is higher than said first maximum value, that gas taken from the first casing is circulated toward the downstream distribution end of the gas drawing-off pipe;
- the tank comprises an air venting regulator connected to the upper end of the first casing;
- the air venting regulator is connected to the upper end of the first casing via a portion of the pressurization pipe, in particular via the first end of the pressurization pipe;
- the air venting regulator comprises a pneumatic valve or an electrically controlled valve configured to control the opening and the closing of the valve in relation to the atmosphere as a function of the pressure measured by the set of one or more sensor(s) in relation to a determined high threshold;
- the air venting regulator is configured to automatically maintain the pressure in the first casing below a second maximum value by ensuring, when the pressure in the first casing is higher than said second maximum value, that the gas taken from the first casing is discharged toward the outside atmosphere;
- at least two from among: the regulating valve of the pressurization pipe, the air venting regulator, the regulating valve of the vaporized gas drawing-off pipe, are integrated in the same housing or set of one or more regulating valve(s);
- at least two from among: the regulating valve of the pressurization pipe, the air venting regulator, the regulating valve of the vaporized gas drawing-off pipe, are made up of the same automated regulating valve comprising a plurality of inlets and outlets respectively connected to the first end of the pressurization pipe of the first casing, to the first upstream end of the drawing-off pipe, to the downstream distribution end of the vaporized gas drawing-off pipe, and to the atmosphere;
- the automated distribution valve is a linear movement valve or a rotary valve;
- the pressure measured by the set of one or more sensor(s) comprises at least one from among: the pressure in the upper part of the first casing, the pressure in the lower part of the first casing, a pressure difference between the pressure in the upper part of the first casing and the pressure in the lower part of the first casing;

at least one from among the regulating valve of the pressurization pipe, the air venting regulator, the regulating valve of the vaporized gas drawing-off pipe, is a regulating valve sensitive to the pressure measured by the set of one or more sensor(s);

the filling circuit comprises a first filling pipe having an upstream end intended to be connected to a fluid source and a downstream end connected to the lower portion of the first casing, the filling circuit comprising a second filling pipe having an upstream end intended to be connected to the fluid source and a downstream end connected to the upper portion of the first casing, the filling circuit comprising a set of one or more distribution valve(s) configured to allow distribution of the fluid originating from the fluid source in the filling pipes;

the set of one or more valve(s) for distributing the filling flow and the set of one or more regulating valve(s) are integrated in a single common valve;

the one or more valve(s) is/are controlled by at least one from among: the set of sensors, the fluid present in the pressure measurement line;

the set of one or more distribution valve(s) is configured to automatically regulate the pressure in the first casing to a predetermined setpoint pressure during filling by ensuring automatic distribution of the flow of fluid originating from the source in the filling pipes as a function of the pressure setpoint and of the pressure measured by the set of one or more sensor(s);

the set of one or more distribution valve(s) is of a similar design or structure to that of the set of one or more valve(s) (valve for regulating the pressurization pipe and/or valve for regulating the drawing-off pipe and/or air venting regulator);

the set of one or more distribution valve(s) has adjustment thresholds for the control thereof that are identical or similar to those of the set of one or more valve(s) (valve for regulating the pressurization pipe and/or valve for regulating the drawing-off pipe and/or air venting regulator);

the set of one or more distribution valve(s) comprises at least one valve that is pneumatically activated and/or is activated via a set of one or more return component(s), in particular one or more spring(s);

the set of one or more distribution valve(s) is sensitive to the pressure measured by the set of one or more sensor(s) measuring the pressure in the first casing, i.e. the set of one or more distribution valve(s) has at least one movable element closing or opening a passage for the fluid between the fluid source and the one or more filling pipe(s), said movable element being moved into a plurality of positions according to the pressure difference between, on the one hand, a setting force corresponding to the predetermined pressure setpoint and, on the other hand, the pressure measured by the set of one or more sensor(s);

the set of one or more distribution valve(s) comprises at least one electrically controlled valve and an electronic device for controlling the controlled valve configured to control the opening and the closing of the valve as a function of, on the one hand, the predetermined pressure setpoint and, on the other hand, the pressure measured by the set of one or more sensor(s);

the set of one or more distribution valve(s) comprises a housing comprising a fluid inlet intended to be connected to the source, two outlets respectively connected to the two filling pipes and a translationally and/or rotationally movable distributor located in the housing and ensuring the connection or the non-connection of the inlet with the one or more outlet(s) according to the position of the movable distributor;

the set of one or more valve(s) comprises an additional inlet connected to the set of one or more sensor(s) and/or to control electronics and/or to a mechanical and/or pneumatic control assembly, such as a set of one or more spring(s) and/or membrane(s);

the housing of the set of one or more distribution valve(s) comprises a fluid inlet connected to the upstream end of the pressurization pipe and an outlet connected to the pressurization pipe portion comprising the heater. The invention can also relate to any alternative device or method comprising any combination of the aforementioned or following features within the scope of the claims.

BRIEF DESCRIPTION OF THE FIGURES

Further particular features and advantages will become apparent upon reading the following description, which is provided with reference to the figures, in which.

DETAILED DESCRIPTION OF THE INVENTION

Figure 1:
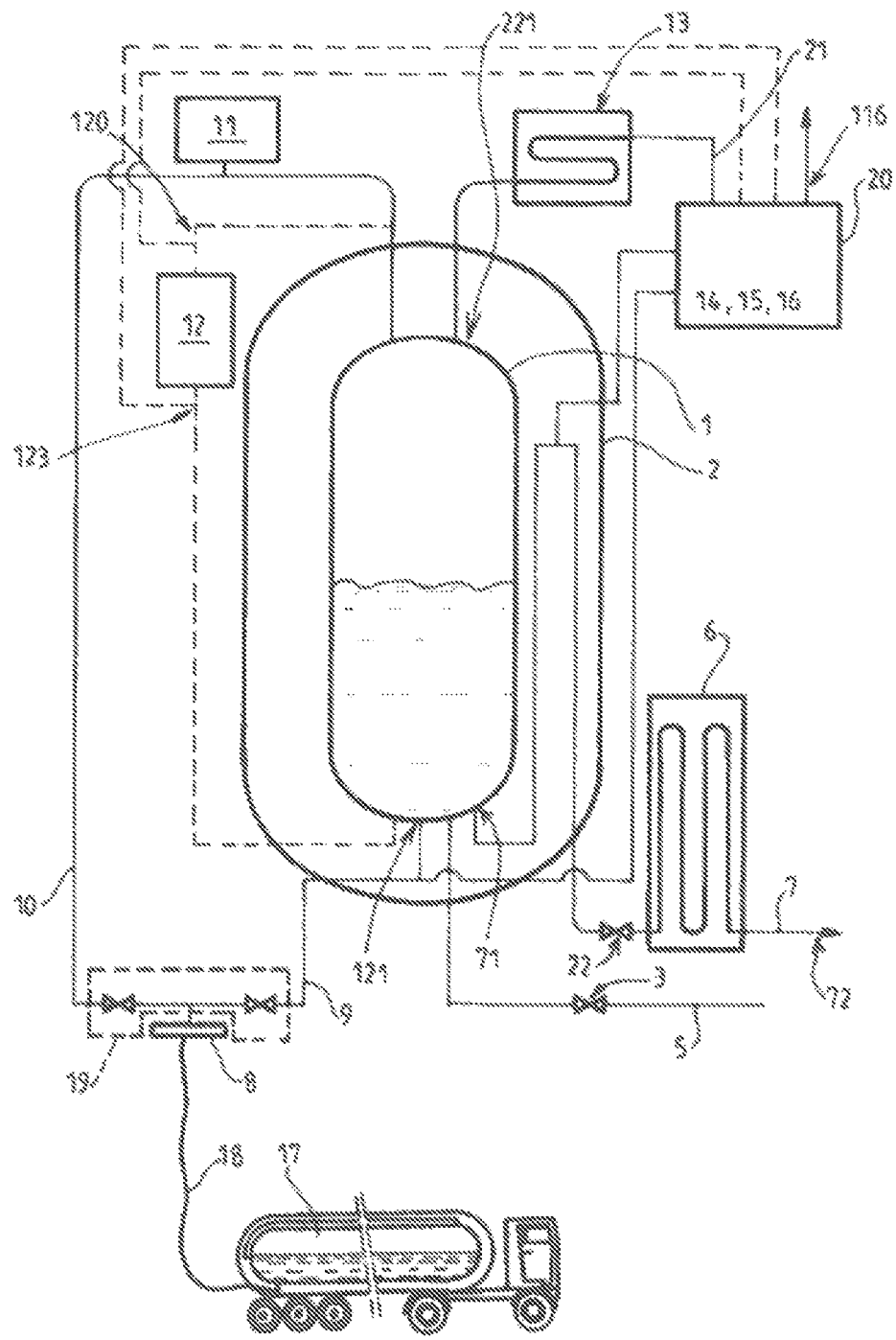
FIG. 1 shows a schematic and partial vertical section view illustrating an example of the structure and of the operation of one possible embodiment of the tank.

The tank shown in FIG. 1 is a tank for storing cryogenic fluid, and in particular a two-phase mixture of liquid and of gas.

Preferably, the tank is a double-casing cryogenic tank, comprising a first internal casing 1 intended to contain the cryogenic fluid. The first casing 1 is preferably surrounded by a second casing 2 and the tank can comprise thermal insulation in the space between the two casings (in particular a vacuum space).

Typically, the first casing 1 contains a liquid phase in the lower part (cryogenic fluid in liquid form at a very low temperature, for example, nitrogen is at a temperature of −185° C. at a pressure of 2 bar, the value of the temperature depends on the equilibrium pressure) and a gaseous phase in the upper part ("gaseous ceiling").

Conventionally, the tank comprises at least one drawing-off pipe 5, 7 having an upstream end connected to the first casing 1 and being configured to allow fluid contained in the first casing 1 to be drawn-off toward the outside of the tank. For example, and as illustrated, the tank can comprise a first drawing-off pipe 5, the upstream end of which is connected to the lower part of the first casing 1 in order to draw-off liquid (and preferably via a valve 3).

Similarly, the tank can comprise another (or second) drawing-off pipe 7, a first upstream end 221 of which is connected to the upper part of the first casing 1 in order to draw-off fluid in the gaseous state. This vaporized gas drawing-off pipe 7 preferably comprises a valve 15, 20 for regulating the flow of fluid toward a downstream distribution end 72 provided with a vaporizer 6 (or heater), and optionally at least one other valve 22.

The vaporized gas drawing-off pipe 7 preferably comprises a second upstream end 71 connected to the lower part of the first casing 1. This second upstream end 71 is connected to the vaporizer 6, to allow fluid to be drawn-off in the liquid state and to be vaporized in the vaporizer 6 with a view to supplying vaporized gas at the downstream distribution end 72. In other words, the first 221 and second 71 upstream ends can be connected parallel to the downstream end 72 and to the vaporizer 6.

Thus, advantageously, the tank can comprise a line with one end connected to the regulating valve 15, 20, and another end that is connected between, on the one hand, the second end 71 (connected to the bottom of the first casing) and, on the other hand, the valve 22 and the vaporizer of the downstream end 72.

This external use vaporizer 6 can be a heat exchanger used to convert the cryogenic liquid or gas drawn-off from the internal tank into gas through an exchange with the ambient atmosphere.

The tank comprises a set 12 of one or more sensor(s) measuring the pressure in the first casing 1 in its upper and/or lower part.

Furthermore, the tank comprises a pipe 21 for pressurizing the first casing 1 comprising a first end 121 connected to the lower end of the first casing 1 and a second end 221 connected to the upper part of the first casing 1.

The pressurization pipe 21 comprises at least one regulating valve 14, 20 and a heater 13, in particular a vaporization heat exchanger using, for example, air as a heat source.

The regulating valve 14, 20 of the pressurization pipe 21 is configured to automatically maintain the pressure in the first casing 1 at a minimum determined value Pc by ensuring, when the pressure in the first casing 1 is lower than said minimum value, that liquid taken from the first casing 1 is circulated in the heater 13 and that this heated fluid is re-introduced into the first casing 1.

The heater 13 allows liquid taken from the bottom of the first casing 1 to be vaporized in order to generate the gas, which allows, when necessary, the pressure of the gaseous phase to be increased by means of the regulator 14, 20. This pressurization regulator 14, 20 opens, if necessary, the passage for the liquid from the liquid phase to its gaseous phase when the pressure of the gaseous phase is lower than a pressure that is set on the appliance, in particular the working pressure.

The regulating valve 14, 20 of the pressurization pipe 21 preferably is sensitive to the pressure measured by the set 12 of one or more sensor(s) measuring the pressure in the first casing (see FIG. 1 to FIG. 5).

In other words, this regulating valve 14, 20 can comprise at least one movable element closing or opening a passage for the fluid in the pressurization pipe 21. This movable element is opened or closed, in particular according to the pressure difference between, on the one hand, a setting force corresponding to a minimum pressure value and, on the other hand, the pressure measured by the set 12 of one or more sensor(s).

As an alternative embodiment or in combination, the regulating valve 14, 20 of the pressurization pipe 21 can comprise at least one electrically controlled valve and an electronic device for controlling the controlled valve configured to control the opening and the closing of the valve as a function of, on the one hand, the minimum pressure value and, on the other hand, the pressure measured by the set 12 of one or more sensor(s).

Preferably, the regulating valve 15, 20 of the vaporized gas drawing-off pipe 7 is configured to automatically reduce, during client drawing-off via said drawing-off pipe 7, the pressure in the first casing 1 below a first determined maximum value by ensuring, when the pressure in the first casing 1 is higher than said first maximum value, that gas taken from the first casing 1 is circulated toward the downstream distribution end 72 of the gas drawing-off pipe 7. The first determined maximum value depends on the type of tank and on the application.

Therefore, this valve 15, 20 (or economizer) is configured to open the passage between the gaseous phase of the first casing 1 and the downstream end 72 when the pressure in this upper part of the first casing 1 is higher than a predetermined and, for example, preset pressure (first maximum value). For example, this predetermined pressure is equal to the working pressure of the tank Pc+0.5 bar. This allows the pressure in the gaseous phase of the first casing 1 to be regulated downward, when necessary, when gas originating from the tank is used.

In other words, when the pressure in the first casing 1 is higher than said first maximum value, pressurized gas is taken from the first casing in order to reduce the pressure therein, and this gas can be routed toward the downstream distribution end 72. In other words, this gas is used by the application supplied by the tank.

Conventionally, the tank can comprise a protection component 11, such as a valve and/or a shear disk, allowing fluid to be released toward the outside in the event of pressure exceeding a limit in the first casing 1. Typically, this limit is the maximum allowable pressure of the tank (provided by the manufacturer).

The tank also preferably comprises a separate air venting regulator 16, 20 connected to the upper end of the first casing.

As is particularly illustrated in FIG. 1, the air venting regulator 16, 20 can be connected to the upper end of the first casing 1 via a portion of the pressurization pipe 21, in particular via the first end 221 of the pressurization pipe.

The air venting regulator 16, 20 comprises, for example, a pneumatic valve or an electrically controlled valve configured to control the opening and the closing of the valve in relation to the atmosphere as a function of the pressure measured by the set 12 of one or more sensor(s) in relation to a determined high threshold.

The air venting regulator 16, 20 can be configured to automatically maintain the pressure in the first casing 1 below a second maximum value by ensuring, when the pressure in the first casing 1 is higher than said second maximum value, that the gas taken from the first casing 1 is discharged toward the outside atmosphere.

This second maximum value can be higher than the first maximum value and can range between, for example, this first maximum value and the maximum allowable pressure. This second maximum value typically can be equal to the opening pressure of the protection component 11, less one bar.

This allows the pressure of the gaseous phase to be maintained, when necessary, in the event that gas is not used by the client, without applying the one or more safety component(s) 11. Indeed, when gas is not drawn-off for a long period (no possible discharge of gas via the end 72, for example), this causes a natural increase in pressure inside the first casing 1.

In other words, when the pressure in the tank exceeds a limit safety value (which depends on the type of tank), the air venting regulator 16 purges the excess pressure toward the outside 116 (toward the atmosphere or a collection zone).

Preferably, at least two from among: the regulating valve 14, 20 of the pressurization pipe 21, the air venting regulator 16, 20, the regulating valve 15, 20 of the vaporized gas drawing-off pipe 7, are integrated in the same housing 20 or set of one or more valve(s).

Figure 2:
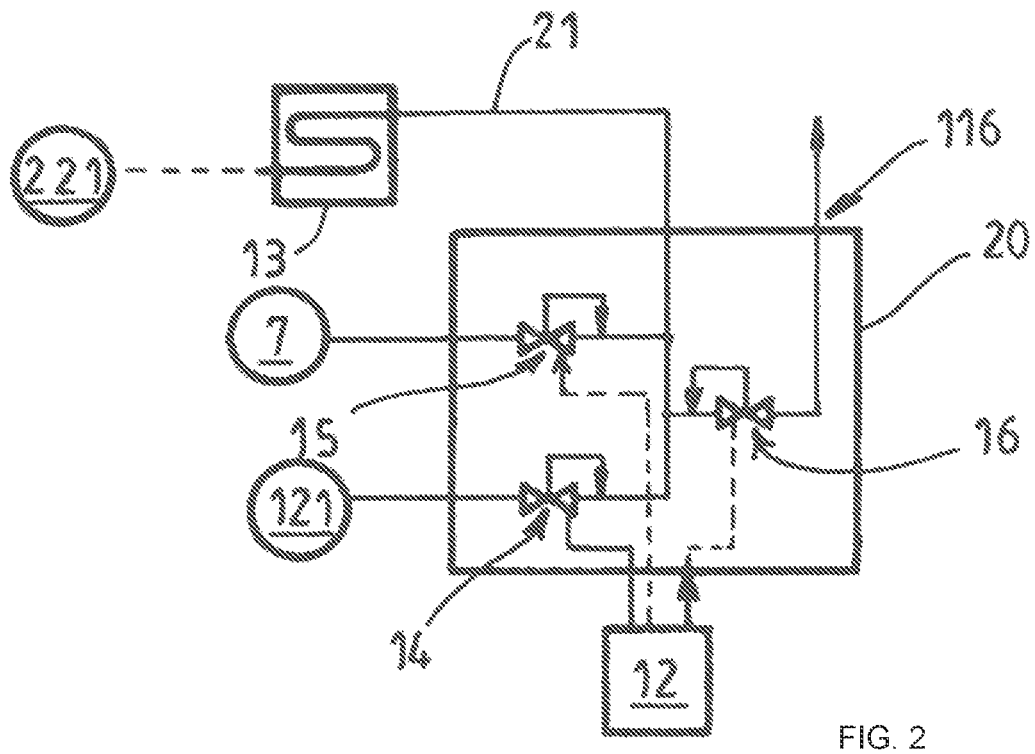
FIG. 2 shows a schematic and partial view illustrating a first example of the structure and of the operation of one or more valve(s) for controlling the pressure of such a tank.

In the example of FIG. 2, the regulating valve 14 of the pressurization pipe 21, the air venting regulator 16 and the regulating valve 15 of the vaporized gas drawing-off pipe 7, are separate valves (pneumatic and/or controlled) that are integrated in the same housing 20 or set of regulating valves.

The tank comprises a circuit that allows:
the regulating valve 14 of the pressurization pipe 21 to regulate the flow of fluid between the lower end of the first casing 1 (reference 121) and the upper end of the first casing (reference 221 via the heater 13);
the regulating valve 15 of the gas drawing-off pipe 7 to regulate the flow of fluid between the upper end of the first casing 1 (reference 221) and the downstream gas distribution end 72 (via the vaporizer 6);
the air venting regulator 16 to regulate the flow of fluid between the upper end of the first casing 1 (reference 221) and an orifice toward the outside.

To this end, the regulating valves 14 and 15 of the pressurization pipe 21 and of the gas drawing-off pipe 7 can be connected parallel to the second upstream end 221 of the pressurization pipe 21. Similarly, these two regulating valves 14 and 15 can be connected parallel to the air venting regulator 16.

Of course, two or three of these valves 14, 15, 16 can be consolidated into a common valve.

Figure 3:
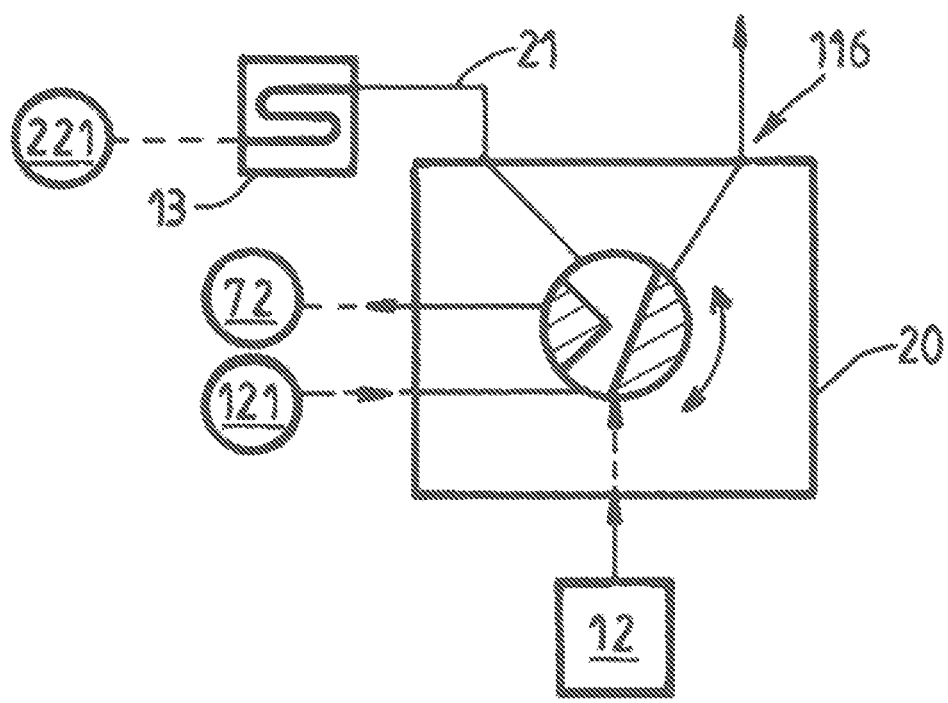
FIG. 3 shows a schematic and partial view illustrating a second example of the structure and of the operation of one or more valve(s) for controlling the pressure of such a tank.

In the example of FIG. 3, these three valves 14, 15, 16 or regulators are made up of the same automated rotary regulating valve 20. This regulating valve 20 can comprise a plurality of inlets and/or outlets respectively connected to the first end 121 of the pressurization pipe 21 of the first casing 1, to the first upstream end 221 of the drawing-off pipe, to the downstream distribution end of the vaporized gas drawing-off pipe 7, and to the atmosphere 116. This regulating valve 20 receives the one or more pressure measurement(s) from the pressure sensor 12.

The rotation of a sphere or of movable distribution sectors may or may not guarantee the circulations of fluid described above by producing suitable distributions of fluid between the inlets and the outlets.

Figure 4:
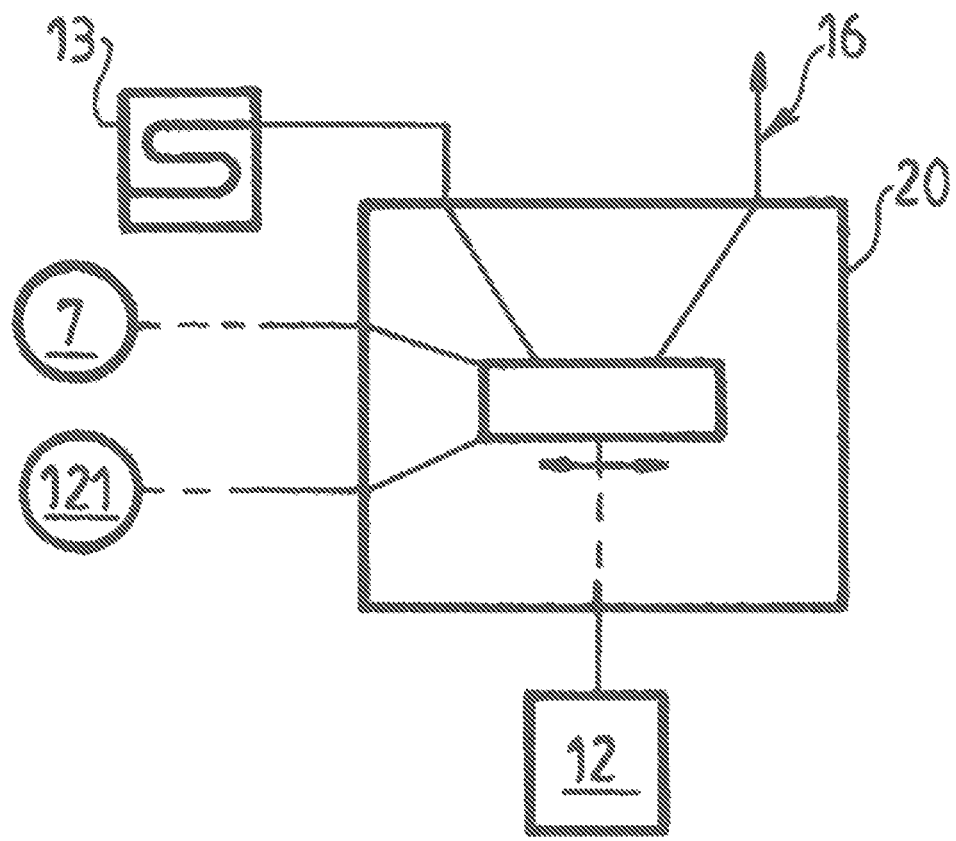
FIG. 4 shows a schematic and partial view illustrating a third example of the structure and of the operation of one or more valve(s) for controlling the pressure of such a tank.

In the example of FIG. 4, the regulating valve 20 is a slide valve (translationally and/or rotationally movable).

Figure 5:
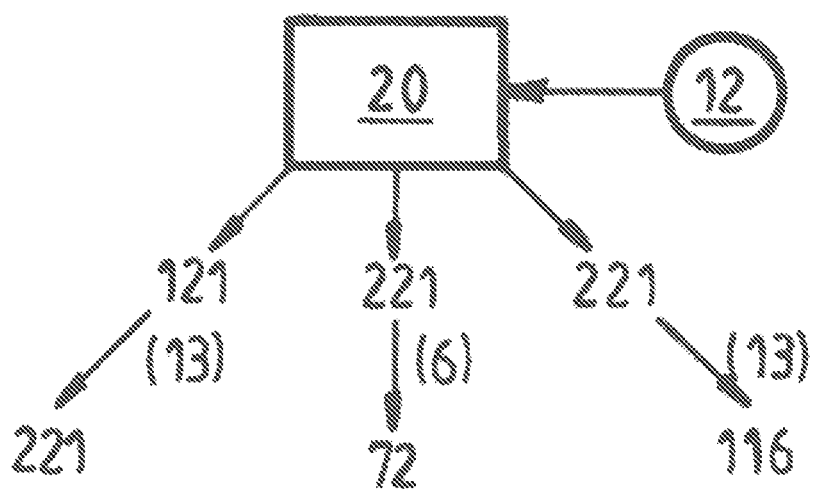
FIG. 5 shows a schematic and partial view illustrating a fourth example of the structure and of the operation of one or more valve(s) for controlling the pressure of such a tank.

Thus, as schematically shown in FIG. 5, the set 20 of one or more regulating valve(s) receives the pressures and/or the information from the pressure sensor set 12 and accordingly:
regulates a flow of fluid between the ends 121 and 221 via the heater 13 (pressurized); and/or
regulates a flow of fluid between the ends 221 and 72 via the vaporizer 6 (reduction of the pressure via a discharge toward the distribution end); and/or
regulates a flow of fluid between the ends 221 and 116 (via the heater) (reduction of the pressure via a discharge toward the atmosphere).

The set 12 of one or more sensor(s) can comprise a stage for measuring the pressure and, optionally, the level of liquid.

This set 12 of one or more sensor(s) preferably measures (and displays and/or transmits, if applicable) the pressure and/or the information relating to the pressure prevailing in the gaseous phase (upper part) and/or the pressure and/or the pressure information relating to the lower part (in the liquid phase), as well as the level of liquid in the liquid phase (lower part of the first casing). This level of liquid can be determined by the pressure difference between the bottom and the top of the first casing, from which the height of the hydrostatic fluid column is deduced.

The pressure of the fluid at the lower end of the first casing is equal to the pressure of the gaseous phase, increased by the hydrostatic pressure generated by the height of liquid in the liquid phase.

To this end, the set 12 of one or more sensor(s) can comprise a pressure tap 120 for the gaseous phase (measured in the upper part of the first casing 1) and a pressure tap 123 for the liquid phase (measured in the lower part of the first casing 1). These two pressure taps are symbolically shown by the ends of the dashed lines connected in the lower and upper part of the tank and to the measurement housing 12, see FIG. 1.

Conventionally, the set 12 of one or more sensor(s) can comprise sensors of the type measuring a static pressure and/or a differential pressure.

As shown in FIG. 1, the filling circuit can comprise a first filling pipe 9 with an upstream end intended to be connected to a fluid source (such as a hose 18 of a container 17 transported by a truck) and a downstream end connected to the lower portion of the first casing 1.

The filling circuit preferably comprises a second filling pipe 10 having an upstream end intended to be connected to the fluid source 17 and a downstream end connected to the upper portion of the first casing 1.

As illustrated, the downstream end of the first filling pipe 9 can be shared with the first end 121 of the pressurization pipe 21. In other words, the first filling pipe 9 and the pressurization pipe can be connected to the lower part of the tank via a shared portion.

Preferably, the upstream ends of the first 9 and second 10 filling pipes are configured to be simultaneously connected to the same fluid source 17, for example, at a shared inlet or flange 8.

The filling circuit comprises a set 19 of one or more distribution valve(s) configured to allow the fluid originating from the fluid source 17 to be distributed in one or the filling pipe(s) 9, 10.

The set 19 of one or more distribution valve(s) is configured, for example, to automatically regulate the pressure in the first casing 1 to a predetermined setpoint pressure Pc during filling by ensuring automatic distribution of the flow of fluid originating from the source 17 in the filling pipes 9, 10, as a function of the pressure setpoint Pc and of the pressure measured by the set 12 of one or more sensor(s).

The measured pressures can be used directly as energy to activate the set of valves 19 and 20 or can be used indirectly (the measured pressure information is used to generate a force for controlling the set of valves).

For example, the predefined pressure setpoint Pc typically is the working pressure of the tank (for example, as a function of the requirement of the gas user and of the installation downstream of the tank). This pressure can be the pressure at which the fluid of the gaseous ceiling must be maintained (according to the use in the gaseous ceiling), or the pressure at which the liquid part in the bottom of the tank must be maintained (according to the use of the fluid in its liquid phase).

The maximum working pressure of the tank generally ranges between one and forty bar, in particular between 7 and 12 bar depending on the types and sizes of tanks. This maximum working pressure (or "maximum allowable working pressure") is, for example, defined by the tank manufacturer.

Preferably, the tank comprises a filling terminal 8 or a flange for connecting the delivery hose 19 of the source 17.

The set 19 of one or more distribution valve(s) can be configured to automatically regulate the pressure in the first casing 1 to the predetermined pressure setpoint Pc of the tank during filling. This regulation is implemented by filling the first casing 1 only via the first filling pipe 9 or only via the second filling pipe 10, or via the two pipes simultaneously.

The set 19 of valves regulates the flow (through section) and the distribution of the cryogenic liquid supplied by the source 17 in the two pipes 9, 10 in order to maintain or reach this setpoint pressure Pc.

The set 19 of one or more valve(s) can comprise at least one pneumatic valve. Preferably, the set 19 of one or more valve(s) is a solely mechanical and/or pneumatic device.

For example, a pressure is maintained on a valve (gas pressure and/or spring or equivalent) that converts the valve into a pressure regulator.

For example, as previously, the set 19 of one or more distribution valve(s) is sensitive to the pressure measured by the set 12 of one or more sensor(s) measuring the pressure in the first casing 1. In other words, the set 19 of one or more distribution valve(s) can comprise at least one movable element closing or opening a passage for the fluid between the fluid source 17 and the one or more filling pipe(s) 9, 10. This movable element is, for example, moved into a plurality of positions according to the pressure difference between, on the one hand, a setting force corresponding to the predetermined pressure setpoint Pc and, on the other hand, the pressure measured by the set 12 of sensor(s).

Figure 6:
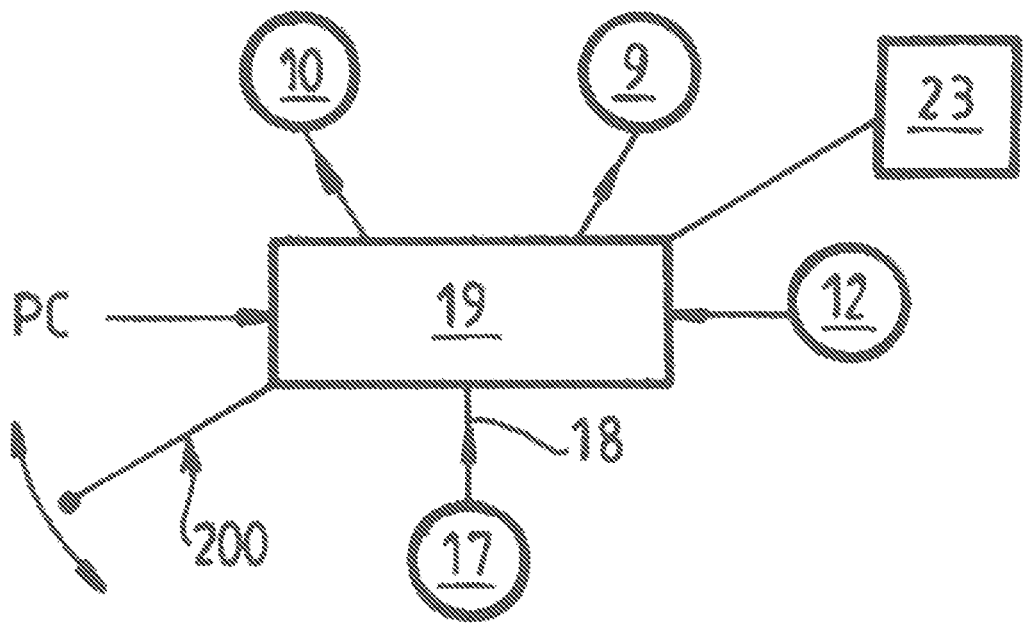
FIG. 6 shows a schematic and partial view illustrating a fifth example of the structure and of the operation of one or more valve(s) for controlling the pressure of such a tank.

As illustrated in FIG. 6, the set 19 of one or more distribution valve(s) can be housed in a housing comprising a fluid inlet intended to be connected to the source 17 (end of the hose 18, for example), two outlets respectively connected to the two filling pipes 9, 10 and a distributor (the movable distribution element) that can move in the housing to ensure the connection or non-connection of the inlet with the one or more outlet(s) according to the pressure measured by the set 12 of one or more sensor(s) and the pressure setpoint Pc.

As schematically shown in FIG. 6, the housing of the set 19 of one or more valve(s) can comprise at least one inlet connected to the set 12 of one or more sensor(s) supplying the one or more pressure measurement(s) (pressure in the upper part, pressure in the lower part, pressure measurement in the source 17, in particular at the hose 18).

Figure 7:
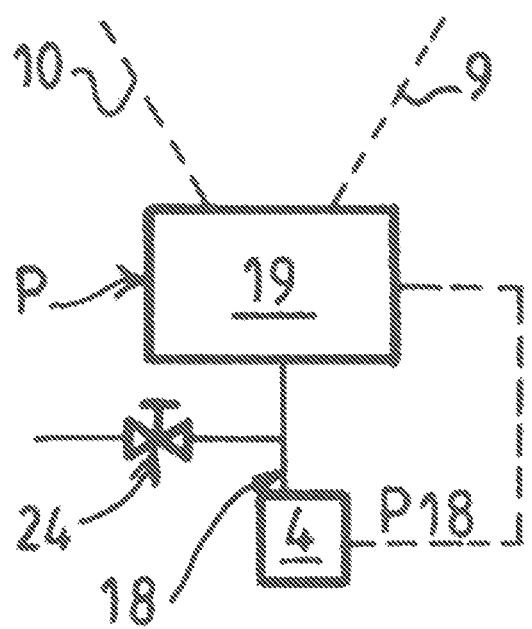
FIG. 7 shows a schematic and partial view illustrating a sixth example of the structure and of the operation of one or more valve(s) for controlling the pressure of such a tank.

For example, as schematically shown in FIG. 7, a detection component 4 (integrated in or separate from the set 12 of sensors) measures the pressure P18 in the fluid source 17, 18 (for example, at the hose) and the set 19 of one or more distribution valve(s) can be configured to interrupt any passage of fluid originating from the source 17, 18 toward the filling pipes 9, 10 when the pressure measured by the detection component 4 is lower than a second determined threshold (for example, lower than one barg=one relative bar). This automatic safety measure prevents any spillage from the tank, particularly if the hose breaks or is incorrectly connected.

The set 19 of one or more valve(s) can also integrate pressure setpoints (pressure setpoint Pc and first safety threshold that corresponds to the maximum allowable pressure in the tank), see FIG. 6.

As previously described for the valve 20, the movable element of the one or more valve(s) can rotationally and/or translationally move.

Figure 8:
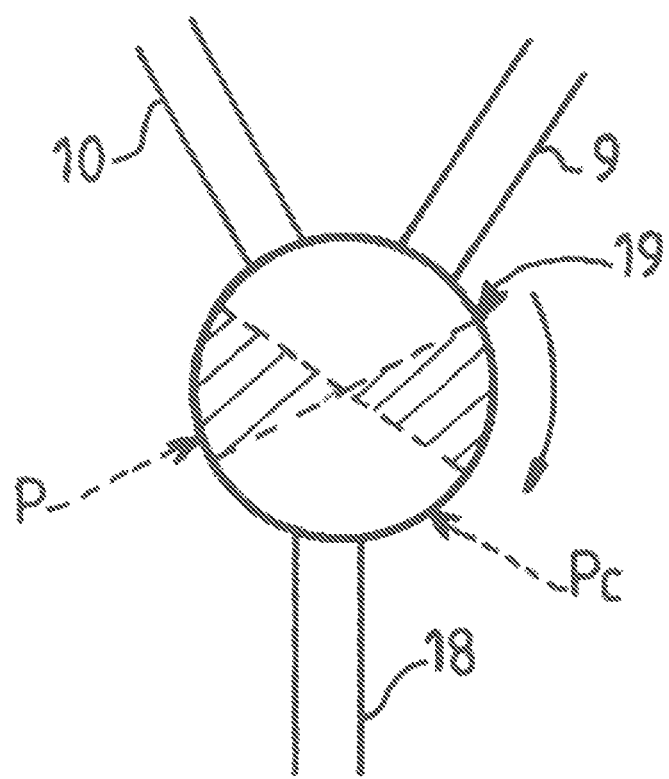
FIG. 8 shows a schematic and partial view illustrating a seventh example of the structure and of the operation of one or more valve(s) for controlling the pressure of such a tank.

FIG. 8 schematically shows the case of a rotationally movable element. For example, a rotary sphere or cylinder provided with solid/hollow sectors allows mitigation or distribution of the flow between an inlet (connected to the hose 18 of the source 17) and two outlets respectively connected to the two filling pipes 9, 10. The position of the movable element is, for example, the result of the forces provided by a pressure setpoint Pc and the pressure P measured by the set 12 of sensors.

Of course (and as before for the aforementioned valve or valves 14, 15, 16, 20), this embodiment is not limiting. The set 19 of valves could comprise a translationally movable element, in particular the set 19 of valves could comprise a slide valve. For example, see document FR 2845451A1.

Of course (and as before for the one or more valve(s) 14, 15, 16 and 20), the set 19 of one or more distribution valve(s) could also comprise or be made up of at least one electrically controlled valve and an electronic device for controlling the controlled valve configured to control the flow as a function of, on the one hand, the predetermined pressure setpoint Pc and, on the other hand, the pressure P measured by the set 12 of one or more sensor(s).

Thus, the set 19, 20 of one or more valve(s) can comprise one or more pneumatic or controlled valve(s), two-way valves, three-way valves or any configuration or combination allowing this aforementioned control.

The set 19 of one or more distribution valve(s) can be configured to automatically interrupt any passage of fluid originating from the source 17 toward the filling pipes 9, 10 when the pressure measured by the set 12 of one or more sensor(s) is higher than a first determined safety threshold (for example, this first threshold can be equal to the maximum allowable pressure of the tank, less a difference that is equal to one bar, for example).

Furthermore, the set 19 of one or more distribution valve(s) can be configured to implement automatic distribution of the flow of fluid originating from the source 17, predominantly, and preferably exclusively, in the second filling pipe 10 when the pressure measured by the set 12 of one or more sensor(s) is lower than the safety threshold and higher than the pressure setpoint Pc. In other words, during filling, if the measured pressure ranges between the setpoint pressure Pc and the first safety threshold, the set 19 of one or more valve(s) favors filling via the pipe 10.

Furthermore, the set 19 of one or more distribution valve(s) can be configured to simultaneously implement automatic distribution of the flow of fluid originating from the source 17 in the two filling pipes 9, 10 when the pressure measured by the set 12 of one or more sensor(s) is equal or substantially equal to the pressure setpoint Pc (i.e. the working pressure plus or minus a few percent). Preferably, the filling flow is equally distributed between the two filling pipes 9, 10, but could be distributed in different adjustable proportions.

Furthermore, the set 19 of one or more distribution valve(s) can be configured to implement automatic distribution of the flow of fluid originating from the source 17, predominantly, and preferably exclusively, in the first filling pipe 9 when the pressure measured by the set 12 of one or more sensor(s) is lower than the pressure setpoint Pc.

Thus, depending on the pressure measured in the tank, the set 19 of valves can favor filling from above (as a spray in order to limit/reduce the pressure) or from below (in order to increase the pressure inside the tank) or both (in order to keep the pressure substantially constant).

Thus, in order to ensure filling, the operator/deliverer connects a pressurized liquefied gas source 17 to the tank. For example, they connect the end of the hose 18 to a terminal or flange of the tank. They thus connect the source 17 to the filling circuit. The deliverer can open an isolation valve and the set 19 of one or more valve(s) will automatically implement (or prevent) the transfer of fluid toward the tank according to the predetermined pressure setpoint Pc and the pressure measured by the set 12 of one or more sensor(s).

As illustrated in FIG. 6, the tank can comprise a display 23 for displaying the status and/or the configuration and/or the position of the set 19; 20 of one or more valve(s) and/or the pressure in the tank.

Furthermore, the tank can comprise a manually activated component 200 for controlling the position of the set 19 of valves in order to manually force the distribution of the flow of fluid originating from the source 17 in the filling pipes 9, 10 (and/or the closure of the filling circuit).

Moreover, the regulating valve 14, 20 of the pressurization pipe 21 can be included in or made up of the set 19 of one or more valve(s) for distributing the filling flow. For example, the set of one or more distribution valve(s) could be located on the pressurization pipe 21.

Thus, whilst being simple and inexpensive (in particular when the one or more set(s) 20, 19 of one or more valve(s) is/are purely mechanical and/or pneumatic), the tank has a mechanism that automatically regulates the pressure in the tank outside of the filling operations (and optionally also during the filling operations).

The tank is thus automatically protected against any overpressures or underpressures.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A tank for storing a two-phase mixture of liquid and of gaseous cryogenic fluid, comprising a first casing intended to contain the cryogenic fluid; at least one drawing-off pipe having an upstream end connected to the first casing and being configured to allow fluid contained in the first casing to be drawn-off toward the outside of the tank; a circuit for filling the tank; a set of one or more sensor(s) measuring the pressure in the first casing; a pipe for pressurizing the first casing comprising a first end connected to the lower end of the first casing and a second end connected to the upper part of the first casing; an air venting regulator connected to the upper end of the first casing; and a vaporized gas drawing-off pipe comprising a first upstream end connected to the upper part of the first casing for drawing-off fluid in the gaseous state, wherein:

the pressurization pipe comprises at least one regulating valve and a heater;

the regulating valve of the pressurization pipe is configured to automatically maintain the pressure in the first casing at a minimum determined pressure value by ensuring, when the pressure in the first casing is lower than said minimum value, that the liquid taken from the first casing is circulated in the heater and that this heated fluid is re-introduced into the first casing;

the vaporized gas drawing-off pipe comprises a vaporizer and at least one regulating valve toward a downstream distribution end; and at least two from among,
the regulating valve of the pressurization pipe,
the air venting regulator, and
the regulating valve of the vaporized gas drawing-off pipe, are made up of a same automated regulating valve that comprises a plurality of inlets and outlets respectively connected to the first end of the pressurization pipe of the first casing, to the first upstream end of the drawing-off pipe, to the downstream distribution end of the vaporized gas drawing-off pipe, and to the atmosphere.

2. The tank of claim 1, wherein the regulating valve of the pressurization pipe is sensitive to the pressure measured by the set of one or more sensor(s), said regulating valve comprises at least one movable element closing or opening a passage for the fluid in the pressurization pipe, said movable element is opened or closed according to the pressure difference between a setting force corresponding to a minimum pressure value and the pressure measured by the set of one or more sensor(s).

3. The tank of claim 1, wherein the regulating valve of the pressurization pipe comprises at least one electrically controlled valve and an electronic device for controlling the controlled valve configured to control the opening and the closing of the valve as a function of the minimum pressure value and the pressure measured by the set of one or more sensor(s).

4. The tank of claim 1, wherein the vaporized gas drawing-off pipe comprises a second upstream end connected to the lower part of the first casing, said second upstream end being connected to the vaporizer so as to allow fluid to be drawn-off in the liquid state and to be vaporized in the vaporizer and supply vaporized gas at the downstream distribution end.

5. The tank of claim 1, wherein the regulating valve of the vaporized gas drawing-off pipe is configured to automatically reduce, during drawing-off via said drawing-off pipe, the pressure in the first casing below a first maximum value by ensuring, when the pressure in the first casing is higher than said first maximum value, that gas taken from the first casing is circulated toward the downstream distribution end of the gas drawing-off pipe.

6. The tank of claim 1, wherein the air venting regulator is connected to the upper end of the first casing via a portion of the pressurization pipe.

7. The tank of claim 6, wherein the air venting regulator is connected to the upper end of the first casing via the first end of the pressurization pipe.

8. The tank of claim 1, wherein the air venting regulator comprises a pneumatic valve or an electrically controlled valve configured to control the opening and the closing of the valve in relation to the atmosphere as a function of the pressure measured by the set of one or more sensor(s) in relation to a determined high threshold.

9. The tank of claim 1, wherein the air venting regulator is configured to automatically maintain the pressure in the first casing below a second maximum value by ensuring, when the pressure in the first casing is higher than said second maximum value, that the gas taken from the first casing is discharged toward the outside atmosphere.

10. The tank of claim 1, wherein at least two from among, the regulating valve of the pressurization pipe, the air venting regulator, and the regulating valve of the vaporized gas drawing-off pipe, are integrated in a same housing or set of one or more regulating valve(s).

11. The tank of claim 1, wherein the automated regulating valve is a linear movement valve.

12. The tank of claim 1, wherein the automated regulating valve is a rotary valve.

13. The tank of claim 1, wherein the pressure measured by the set of one or more sensor(s) comprises at least one from among: the pressure in the upper part of the first casing, the pressure in the lower part of the first casing, and a pressure difference between the pressure in the upper part of the first casing and the pressure in the lower part of the first casing.

14. The tank of claim 1, wherein at least one from among, the regulating valve of the pressurization pipe, the air venting regulator, and the regulating valve of the vaporized gas drawing-off pipe, is a regulating valve sensitive to the pressure measured by the set of one or more sensor(s).

15. The tank of claim 1, wherein the filling circuit comprises a first filling pipe having an upstream end intended to be connected to a fluid source and a downstream end connected to the lower portion of the first casing, a second filling pipe having an upstream end intended to be connected to the fluid source and a downstream end connected to the upper portion of the first casing, and a set of one or more distribution valve(s) configured to allow distribution of the fluid originating from the fluid source in the first and second filling pipes.

16. The tank of claim 15, wherein the set of one or more valve(s) for distributing the filling flow and the set of one or more regulating valve(s) are integrated in a single common valve.

17. The tank of claim 1, wherein the heater is a vaporization heat exchanger.

* * * * *